United States Patent
Kim

(10) Patent No.: US 8,243,345 B2
(45) Date of Patent: Aug. 14, 2012

(54) SCAN UNIT HAVING EMI NOISE BLOCKING UNIT AND IMAGE FORMING APPARATUS HAVING THE SCAN UNIT

(75) Inventor: Hyun-surk Kim, Yongin-si (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 575 days.

(21) Appl. No.: 12/105,485

(22) Filed: Apr. 18, 2008

(65) Prior Publication Data

US 2008/0316547 A1 Dec. 25, 2008

(30) Foreign Application Priority Data

Jun. 19, 2007 (KR) .................. 10-2007-0060042

(51) Int. Cl.
*H04N 1/04* (2006.01)
*H04N 1/40* (2006.01)
*G01J 1/04* (2006.01)
*H01R 13/648* (2006.01)

(52) U.S. Cl. .............. 358/474; 358/443; 250/237 R; 439/99

(58) Field of Classification Search .......... 347/50; 439/67, 99; 358/474, 497, 1.13, 443, 471; 174/117; 250/237, 237 R See application file for complete search history.

(56) References Cited

U.S. PATENT DOCUMENTS

| | | | | |
|---|---|---|---|---|
| 5,650,615 | A * | 7/1997 | Buzzelli | 250/237 R |
| 6,958,830 | B2 * | 10/2005 | Kono | 358/443 |
| 2006/0033775 | A1 * | 2/2006 | Tsai et al. | 347/50 |
| 2006/0077478 | A1 * | 4/2006 | Kim et al. | 358/474 |
| 2007/0066101 | A1 * | 3/2007 | Suzuki | 439/99 |
| 2008/0043296 | A1 * | 2/2008 | Chueh | 358/497 |
| 2008/0220626 | A1 * | 9/2008 | Yeh | 439/67 |
| 2008/0236868 | A1 * | 10/2008 | Koga | 174/117 F |
| 2008/0309958 | A1 * | 12/2008 | Nagasaka | 358/1.13 |

FOREIGN PATENT DOCUMENTS

| | | |
|---|---|---|
| JP | 1990-308667 | 12/1990 |
| JP | 7-30710 | 1/1995 |
| JP | 2005-150047 | 6/2005 |
| JP | 2006-015509 | 1/2006 |
| JP | 3873915 | 1/2007 |
| JP | 2007-043237 | 2/2007 |
| KR | 10-2006-0034455 | 4/2006 |

OTHER PUBLICATIONS

CN Office Action issued Sep. 30, 2011 in CN Patent Application No. 200810108401.3.
KR Notice of Allowance issued Oct. 31, 2011 in KR Patent Application No. 10-2007-0060042.
Office Action issued in Korean Patent Application No. 10-2007-0060042 on Jun. 29, 2011.

* cited by examiner

*Primary Examiner* — Charlotte M Baker
*Assistant Examiner* — Justin Katzwhite
(74) *Attorney, Agent, or Firm* — Stanzione & Kim, LLP

(57) ABSTRACT

A scan unit having an electromagnetic interference (EMI) noise blocking unit and usable with an image forming apparatus includes a document plate supporting a document, a reading module which is disposed under the document plate, performs a reciprocating motion, and includes an image sensor that reads an image of the document and generates an image signal in response to the read image, a flexible flat cable (FFC) which is connected to the reading module and functions as a transfer path of power and the image signal, and an EMI noise blocking unit which blocks noise that occurs when the image signal of the reading module is transmitted.

15 Claims, 4 Drawing Sheets

SCAN UNIT HAVING EMI NOISE BLOCKING UNIT AND IMAGE FORMING APPARATUS HAVING THE SCAN UNIT

CROSS-REFERENCE TO RELATED APPLICATIONS

This application claims the benefit and priority under 35 U.S.C. §119(a) of Korean Patent Application No. 10-2007-0060042, filed on Jun. 19, 2007, in the Korean Intellectual Property Office, the disclosure of which is incorporated herein in its entirety by reference.

BACKGROUND OF THE INVENTION

1. Field of the Invention

The present general inventive concept relates to an image forming apparatus, and more particularly, to an image forming apparatus which includes a scan unit having an electromagnetic interference (EMI) noise blocking unit which can remove or prevent EMI noise.

2. Description of the Related Art

A scan unit scans light onto an original document and outputs an image of the original document. For this, the scan unit includes a reader which scans light onto the original document and collects light reflected from the original document.

FIG. 1 is a longitudinal sectional view schematically illustrating a construction of a conventional scan unit.

Referring to FIG. 1, the scan unit includes a scan unit frame 10 and a document supporting plate 20. The document supporting plate 20, which is made of glass in order to allow light to pass therethrough, supports a document S and is disposed at an upper portion of the scan unit frame 10. A reader 30 for reading an image from the document S is provided inside the scan unit frame 10. The reader 30 includes an image sensor 31 and is guided by a guide shaft 40 to perform a reciprocating motion in an arrow direction while scanning light onto the document S placed on the document supporting plate 20. A flexible flat cable (FFC) holder 32 is provided at a lower portion of the reader 30 to connect an end of an FFC 50 to the reader 30. Other end of the FCC 50 is connected to a power source via a controller (not shown) and an image signal is transmitted via the FCC 50 to the reader 30. The FFC 50 is made of a highly flexible material, so that the FFC 50 does not disturb the reciprocating motion of the reader 30. The FFC 50 is provided with an electromagnetic interference (EMI) noise blocking unit 60 made of ferrite.

Since the scan unit includes a power source (5V or 3.3V) for a light source and a power source (24V) for driving the image sensor 31, the EMI noise blocking unit 60 is mounted close to the power sources to minimize EMI noises generated by the power sources.

However, although the EMI noise blocking unit 60 effectively blocks the EMI noises generated by the power sources, the EMI noise blocking unit 60 cannot effectively block EMI noise affecting an image signal when data corresponding to the image signal with high resolution generated by the reader 30 at a high speed transmits to the controller.

SUMMARY OF THE INVENTION

The present general inventive concept provides a scan unit which includes an electromagnetic interference (EMI) noise blocking unit that blocks EMI noise occurring due to an image signal generated from a reader, and an image forming apparatus including the scan unit.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a scan unit including a document plate to support a document, a reading module disposed under the document plate to perform a reciprocating motion and having an image sensor to read an image of the document and to generate an image signal in response to the read image, a flexible flat cable (FFC) connected to the reading module to provide a transfer path of power and the image signal, and an EMI noise blocking unit to block noise occurring when the image signal is transmitted from the reading module.

The reading module may further include an FFC fixing unit which fixes the FFC, and the EMI noise blocking unit may be integrated with the FFC fixing unit.

The foregoing and/or other aspects and utilities of the present general inventive concept may be achieved by providing a scan unit including a reading module having an image sensor to read an image of a document and to generate an image signal in response to the read image, a cable connected to the reading module to provide a transfer path of the image signal, and an EMI noise blocking unit disposed to block noise from the reading module.

The EMI noise blocking unit may be disposed between the reading module and cable.

The EMI noise blocking unit may be formed on the reading unit to protect the cable from the EMI noise of the reading module.

The EMI noise blocking unit may be connected to the reading module.

The cable may include a first portion electrically connected to the reading module to transmit the image signal, a second portion extended from the first portion and disposed to contact the reading module, and a third portion extended from the second portion electrically connected to a controller to transmit the image signal, and the EMI noise blocking unit may be disposed adjacent to the second portion.

The cable may include a bent portion between the second portion and the third portion, and the EMI noise block unit may include a first EMI noise block unit disposed adjacent to the second portion and a second EMI noise blocking unit disposed between the bent portion and the third portion.

The cable may provide another transfer path of power between a power source and the reading module, and the EMI noise blocking unit comprises a first EMI noise block unit disposed adjacent to the reading module and a second EMI noise blocking unit disposed adjacent to the power source to block EMI noise from the power source.

The scan unit may further include a fixing unit to support the cable with respect to the reading module, and the EMI noise blocking unit may be disposed in the fixing unit between the reading module and the cable.

The cable may include a first end connected to the reading module, and a second end extended from the first end to be connected to a controller to receive the image signal; and the EMI noise blocking unit is disposed adjacent to the first end of the cable and away from the second end of the cable.

The scan unit may include a power source to provide power through the cable, and a second EMI noise blocking unit disposed at the other portion of the cable to block noise from the power source.

The cable may include a bent portion between the portion and the other portion; and the cable noise blocking unit and the second EMI noise blocking unit are spaced-apart from each other with respect to the bent portion.

The scan unit may further include a power source spaced apart from the reading unit to supply power to the reading module through the cable, and a second EMI noise blocking unit disposed at the other portion of the cable to block noise from the power source.

The scan unit may further include a power source to provide power through the cable, a controller to receive the image signal from the reading module through the cable, and a second EMI noise blocking unit disposed adjacent to at least one of power source and the controller to block another noise from the power source.

The foregoing and/or other aspects and utilities of the present general inventive concept may be achieved by providing a scan unit including a reading module having an image sensor to generate an image signal, a power source to generate a power, a cable disposed between the reading module and the power source to provide a transfer path of an image signal of the reading module and a power of the power source, and an EMI noise blocking unit disposed on a first portion of the cable to block noise from the reading module, and disposed on a second portion of the cable to block noise from the power source.

The foregoing and/or other aspects and utilities of the present general inventive concept may be achieved by providing an image forming apparatus including a scan unit having a reading module having an image sensor to read an image of a document and to generate an image signal in response to the read image, a cable connected to the reading module to provide a transfer path of the image signal, and an EMI noise blocking unit disposed to block noise from the reading module, and a print unit to form an image on a print medium according to the image signal.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
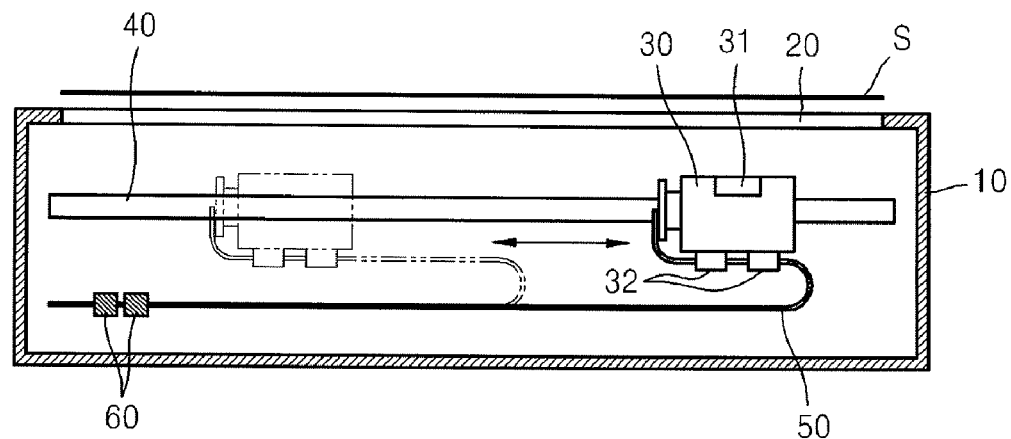
FIG. 1 is a longitudinal sectional view schematically illustrating a construction of a conventional scan unit.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
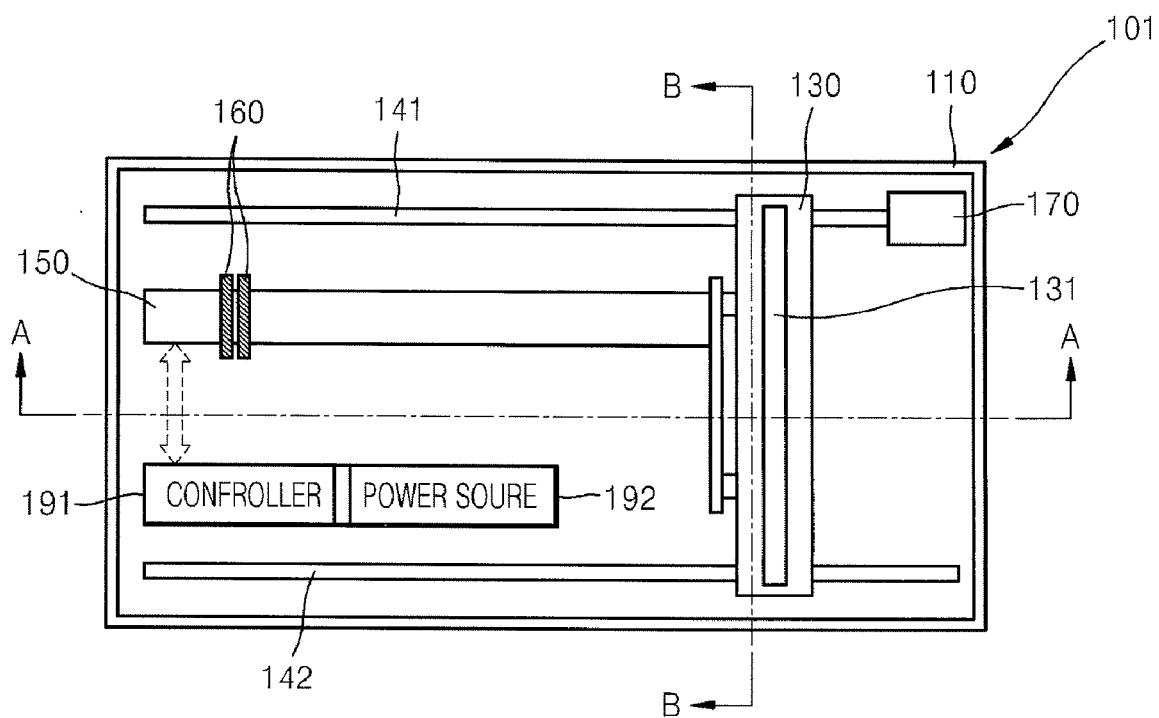
FIG. 2 is a top plan view schematically illustrating a scan unit of an image forming apparatus according to an embodiment of the present general inventive concept.
Figure 3:
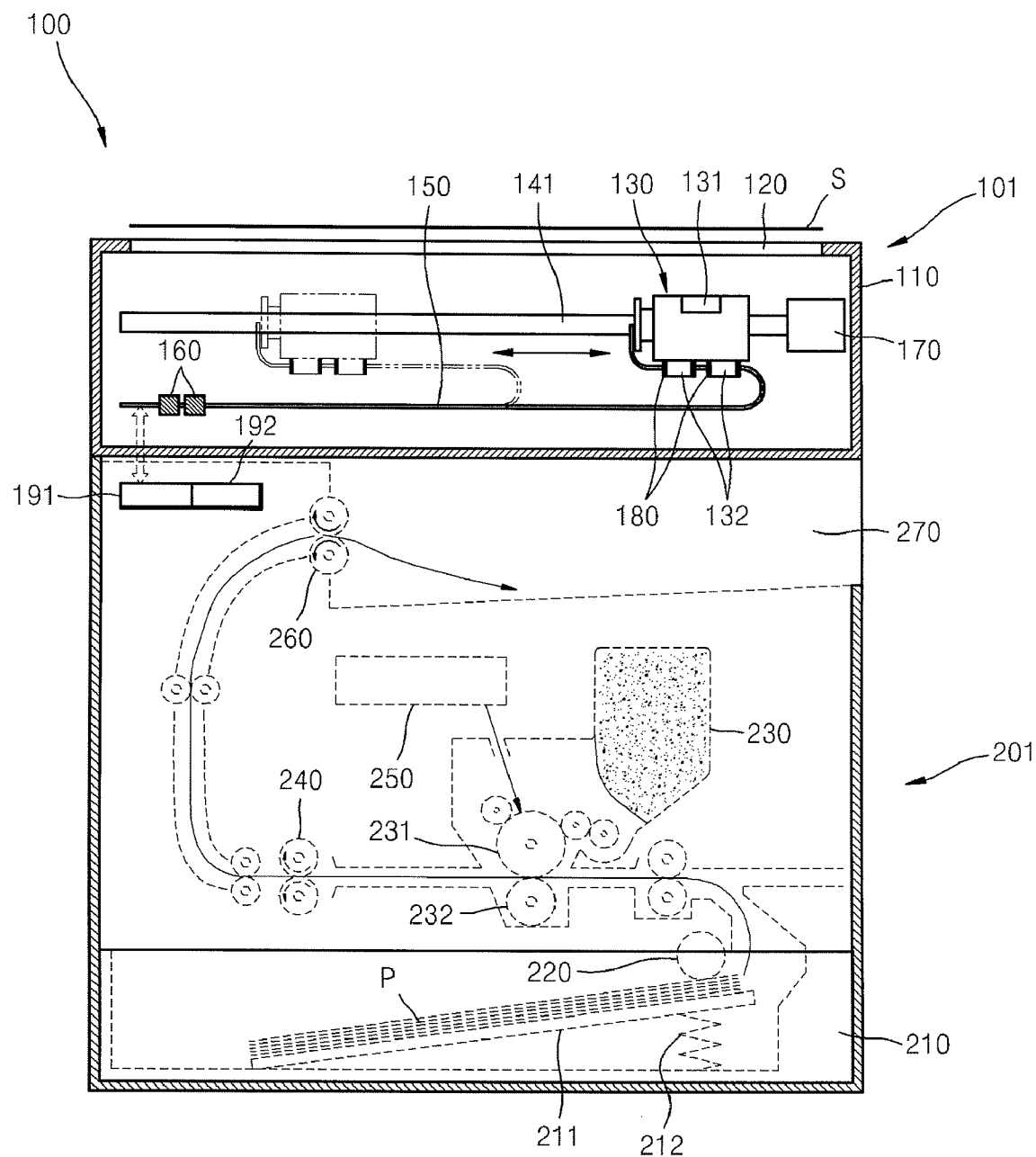
FIG. 3 is a longitudinal sectional view taken along line A-A of FIG. 2.
Figure 4:
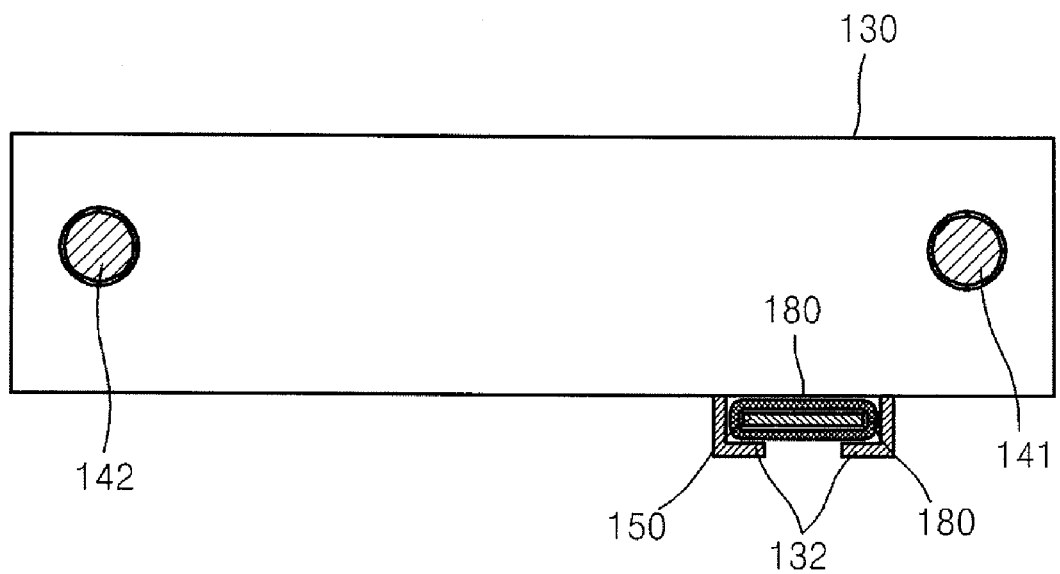
FIG. 4 is a longitudinal sectional view taken along line B-B of FIG. 2 to illustrate an electromagnetic interference (EMI) noise blocking unit according to an embodiment of the present general inventive concept.
Figure 5:
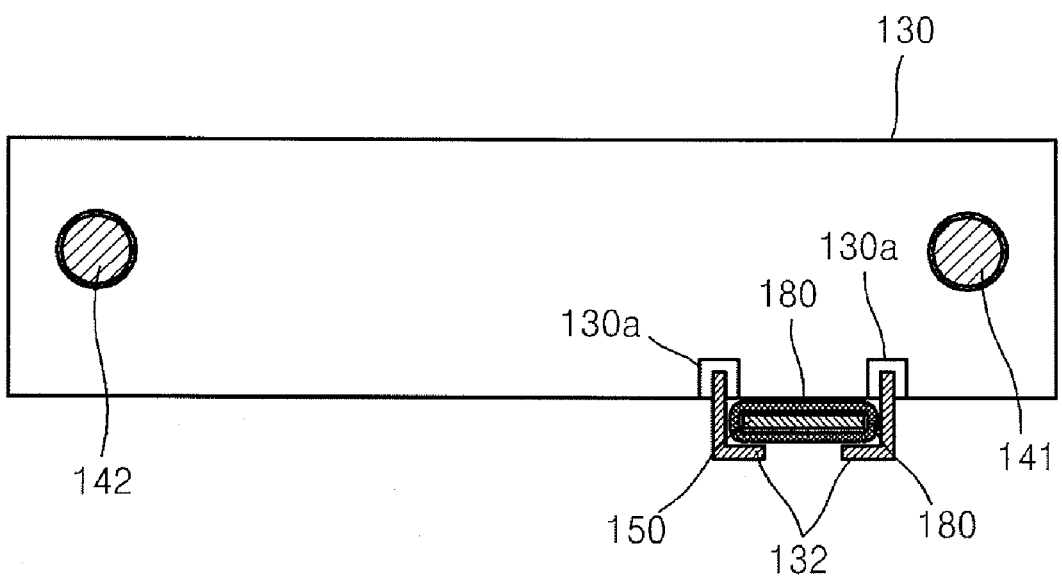
FIG. 5 is a longitudinal sectional view illustrating a flexible flat cable (FFC) fixing unit of FIG. 4 to be detachable from a reading module.
Figure 6:
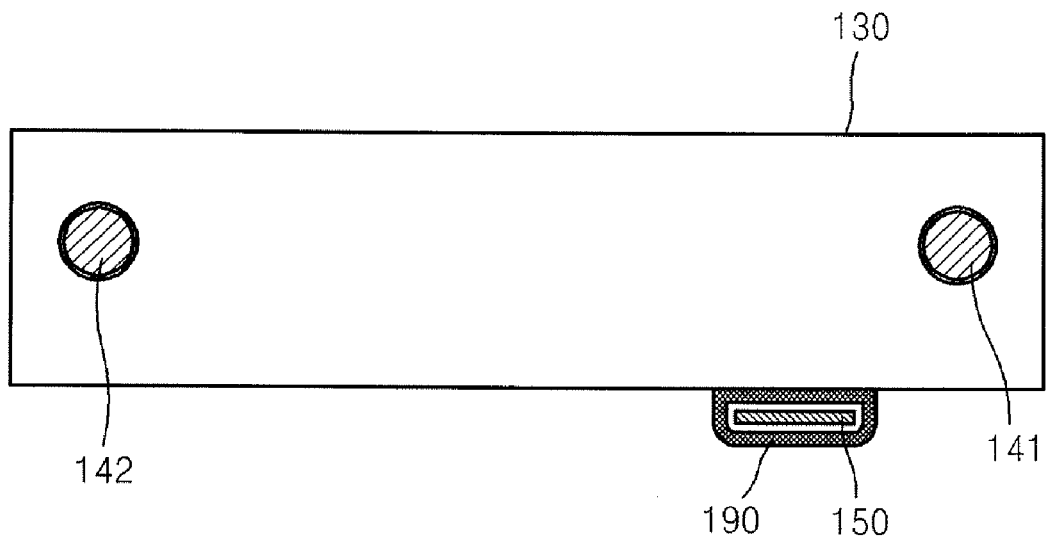
FIG. 6 is a longitudinal sectional view taken along line B-B of FIG. 2 to illustrate an EMI noise blocking unit according to another embodiment of the present general inventive concept.
Figure 7:
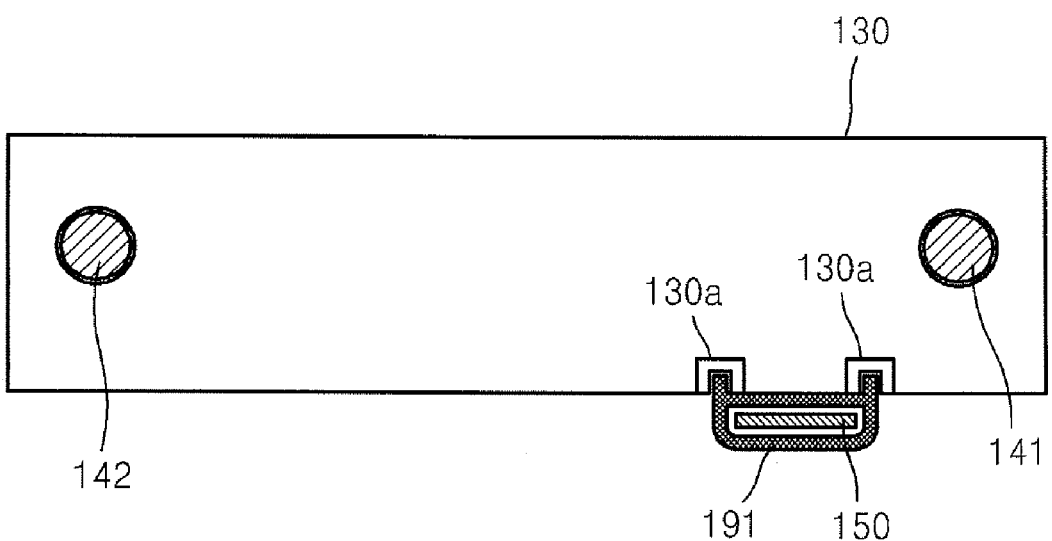
FIG. 7 is a longitudinal sectional view illustrating an FFC fixing unit of FIG. 6 to be detachable from a reading module.

FIG. 2 illustrating a scan unit 101 usable with an image forming apparatus 100 according to an embodiment of the present general inventive concept. FIG. 3 illustrates the image forming apparatus 100 having the scan unit 101. FIG. 4 illustrates an electromagnetic interference (EMI) noise blocking unit 180 of the scan unit 101 according to an embodiment of the present general inventive concept. FIG. 5 illustrates a flexible flat cable (FFC) fixing unit 132 of FIG. 4, which is detachable from a reading module 130. FIG. 6 illustrates an FFC fixing unit 190 having an EMI noise blocking function according to another embodiment of the present general inventive concept. FIG. 7 illustrates an FFC fixing unit 191 having an EMI noise blocking function, which is detachable from the reading module 130.

Referring to FIGS. 2 and 3, the image forming apparatus 100 includes a scan unit 101 which reads an image from a document, and a printing unit 201 which is disposed under the scan unit 101 and prints the image read from the document by the scan unit 101.

The printing unit 201 includes a cassette 210 which stores one or more sheets of paper P, a developing device 230 which includes a photosensitive medium 231 on which an electrostatic latent image corresponding to a read image or an input image is formed, and develops the electro latent image with toner to form a toner image, a transfer roller 232 which faces and forms a nip with the photosensitive medium 231 to transfer the toner image formed on the photosensitive medium 231 to the paper P passing through the nip, an exposure unit 250 which scans light onto the photosensitive medium 231 to form thereon the electrostatic latent image corresponding to the read or input image to be printed, a fixing unit 240 which applies heat and pressure to the toner image so as to be fix the toner image to the paper P, and a paper delivery roller 260 which delivers the paper P to which the toner image is fixed to a storage unit 270.

Although FIG. 3 illustrates the printing unit 201 to form the image using toner using a toner printing structure and method, the present general inventive concept is not limited thereto. It is possible that the printing unit 201 may be an inkjet printer to form an image on the paper P using an inkjet printing structure and method. The inkjet printing structure and method are well known, and thus detail descriptions thereof will be omitted.

The cassette 210 includes a loading plate 211 on which one or more sheets of paper P are loaded and which is elastically biased in an upward direction by a spring 212. A pickup roller 220 is disposed at an upper portion of the cassette 210 to contact and pick up a sheet of the papers P.

The scan unit 101 includes a document supporting plate 120 that is made of glass in order to allow light to pass therethrough and is disposed at an upper portion of a scan unit frame 110 to support a document S, and a reading module 130 which is provided inside the scan unit frame 110 and scans light onto the document S to read an image corresponding to the document S.

The reading module 130 is supported by a shaft unit, for example, a pair of guide shafts 141 and 142 and is constructed to perform a reciprocating motion in an arrow direction. A driving motor 170 for driving the reading module 130 to perform the reciprocating motion in the arrow direction is provided at an end portion of the guide shaft 141.

The reading module 130 includes an image sensor 131 that scans light onto the document S and collects light reflected from the document S to generate an image signal corresponding to the document image, and a flexible flat cable (FFC) fixing unit 132 that is disposed below the image sensor 131 and supports and fixes a portion of an FFC 150 to the reading module 130.

An end portion of the FFC 150 is connected to the reading module 130 to supply power of a power source 192 to components of the reading module 130, such as the image sensor 131 and/or to transmit the generated image signal of the reading module 130 to a controller 191. The power source may be connected to the controller 191 and may supply the power to the reading module 130 through the controller 191 and the FFC 150. The FFC 150 includes both ends electrically connected to the reading module 130 and the controller 191. It is possible that the controller 191 and/or the power source 192 may be disposed in the printing unit 201. In this case, one end of the FFC 150 is extended from the scan unit 101 to the printing unit 201 to be electrically connected to the controller 191 and/or the power source 192.

As describe above, the FFC 150 transmits current from the power source 192 to the reading module 130 and the image signal generated by the image sensor 131 to controller 191. In addition, the FFC 150 is made of a highly flexible material. Therefore, although the reading module 130 performs the reciprocating motion along the pair of the guide shafts 141 and 142, the FFC 150 does not disturb the reciprocating motion of the reading module 130 and can transmit the current and the image signal.

The FFC 150 may provide a first transfer path to transmit the image signal from the reading module 130 to the controller 191 and a second transfer path to transmit the power from the power source 192 to the reading module 130. The first transfer path and the second transfer path can be formed to be separated inside the FFC 150 as a first transfer cable and a second transfer cable, respectively. A conventional cable can be used as the FFC 150 of the scan unit 101.

The FFC fixing unit 132 fixes the portion of the FFC 150 to the reading module 130 to provide a secure connection between the reading module 130 and the FFC 150.

As illustrated in FIG. 4, an EMI noise blocking unit 180 is attached to the FFC fixing unit 132, and the FFC 150 passes through the EMI noise blocking unit 180. That is, the FFC fixing unit 132 includes an inside space to receive the FFC 150, and the EMI noise blocking unit 180 is formed on the inside surface of the FFC fixing unit 132 or disposed between the FFC 150 and the inside surface of the FFC fixing unit 132. The FFC fixing unit 132 and the reading unit 130 may be formed as a single integrated body or a single monolithic body as illustrated in FIG. 4 or may be attachable to detachable from a coupling unit 130a of the reading module 130 as illustrated in FIG. 5.

Referring to FIG. 6, an FFC fixing unit 190 is made of a material having an EMI noise blocking function. That is, the FFC fixing unit has a function of the FFC fixing unit 132 and the EMI noise blocking unit 180 of FIG. 4. The FFC fixing unit 190 does not include a separate EMI noise blocking unit and is made of a material having the EMI noise blocking function. The FFC fixing unit 190 supports the FFC 150 with respect to the reading module 130, fixes the FFC 150 to the reading module, and provides an EMI noise blocking unit, as a single body, to remove the EMI noise or protect the FFC 150 and/or the image signal from the EMI noise. Therefore, the structure including the FFC fixing unit 190 having the EMI noise blocking function illustrated in FIG. 6 may be simpler than the structure including the FFC fixing unit 132 and the EMI noise blocking unit 180.

The FFC fixing unit 190 having the EMI noise blocking function may be integrated into the reading module 130 as illustrated in FIG. 6, and the FFC 150 is disposed inside of the FFC fixing unit 190 to be connected to the reading module 130. As illustrated in FIG. 7, an FFC fixing unit 191 having the EMI noise function may be attachable to and detachable from a coupling unit 130a formed in the reading module 130, and the FFC 150 passes through a hole of the FFC fixing unit 190 to be connected to the reading module 130.

The scan unit 101 may include another EMI noise blocking unit 160 disposed at the other end portion of the FFC 150. The EMI noise blocking unit 160 has the same function as the conventional EMI noise blocking unit illustrated in FIG. 1, that is, to block EMI noises that occur when power is supplied from a power source.

Since the material and the function of the EMI noise blocking units 180 and 160 and the FFC blocking unit 190 and 191 are well known in the art, a detailed description thereof is omitted, and any kind of material having an EMI blocking function can be used.

Accordingly, the EMI noise blocking unit 180 illustrated in FIG. 4 and the FFC fixing unit 190 having the EMI noise blocking function illustrated in FIG. 6 block EMI noise which occurs due to the image signal generated by the image sensor 130 to be transmitted to the controller 191, while the EMI noise blocking unit 160 blocks EMI noise which occurs when power is supplied from the power source 192.

The light from the image sensor 131 is reflected from the document S, and the reflected light is then collected by the image sensor 131. The image sensor 131 outputs a voltage value, which is proportionate to brightness of the collected light, as an image signal in an analog signal form. The analog image signal is transmitted through the FFC 150 connected to the reading module 130, or the analog image signal is converted into a digital signal in the reading module 130 to be transmitted through the FFC 150.

Noise of the image signal transmitted through the FFC 150 or EMI noise generated from the reading module 130 are blocked by the EMI noise blocking unit 180 attached to or formed on the reading module 130 or by the FFC fixing unit 190 or 191.

As described above, the scan unit according to the present general inventive concept has the following advantages.

The EMI noise blocking unit is provided to the reading module, so that EMI noise which occurs when the image signal is generated and/or transmitted can be effectively blocked.

Since the FFC fixing unit is made of the material having an EMI noise blocking function, EMI noise can be blocked and the FFC can be fixed. Therefore, the scan unit has a simple structure and the manufacturing costs thereof can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image forming apparatus comprising:
a scan unit comprising:
a document plate supporting a document,
a reading module which is disposed under the document plate, performs a reciprocating motion, and includes an image sensor that reads an image of the original document and generates an image signal in response to the read image, a flexible flat cable ("FFC") which is connected to the reading module and functions as a transfer path of power and of the image signal, and an electromagnetic interference ("EMI") noise blocking unit located between a noise-generating portion of the reading module and the FFC to block noise that occurs when the image signal of the reading module is transmitted through the FFC; and a printing unit to print an image according to the image signal, wherein the EMI noise blocking unit is part of an FFC fixing unit which fixes the FFC to a side of the reading module to cause the FFC to run along the side of the reading module, and wherein the EMI noise blocking unit is located on an inside portion of the FFC fixing unit.

2. The image forming apparatus of claim 1, wherein the FFC fixing unit is detachable from the reading module.

3. The image forming apparatus of claim 1, wherein the FFC fixing unit is detachable from the reading module.

4. A scan unit comprising:
a reading module having an image sensor to read an image of a document and to generate an image signal in response to the read image;
a cable connected to the reading module to provide a transfer path of the image signal; and
an EMI noise blocking unit disposed between a noise-generating portion of the reading module and the cable to block noise from the reading module,
wherein:
the cable comprises:
a first portion electrically connected to the reading module to transmit the image signal,
a second portion extended from the first portion and disposed to contact the side of the reading module, and
a third portion extended from the second portion electrically connected to a controller to transmit the image signal; and
the EMI noise blocking unit is disposed adjacent to the second portion.

5. The scan unit of claim 4, wherein the EMI noise blocking unit is formed on the reading unit to protect the cable from the EMI noise of the reading module.

6. The scan unit of claim 4, wherein the EMI noise blocking unit is connected to the reading module.

7. The scan unit of claim 4, wherein:
the cable comprises a bent portion between the second portion and the third portion; and
the EMI noise block unit comprises a first EMI noise block unit disposed adjacent to the second portion and a second EMI noise blocking unit disposed between the bent portion and the third portion.

8. The scan unit of claim 4, wherein:
the cable provides another transfer path of power between a power source and the reading module; and
the EMI noise blocking unit comprises a first EMI noise block unit disposed adjacent to the reading module and a second EMI noise blocking unit disposed adjacent to the power source to block EMI noise from the power source.

9. The scan unit of claim 4, wherein:
the cable comprises a first end connected to the reading module, and a second end extended from the first end to be connected to a controller to receive the image signal; and
the EMI noise blocking unit is disposed adjacent to the first end of the cable and away from the second end of the cable.

10. The scan unit of claim 4, further comprising:
a fixing unit to support the cable with respect to the reading module,
wherein the EMI noise blocking unit is disposed on the fixing unit.

11. The scan unit of claim 4, further comprising:
a power source to provide power through the cable; and
a second EMI noise blocking unit disposed at the other portion of the cable to block noise from the power source.

12. The scan unit of claim 11, wherein:
the cable comprises a bent portion between the portion and the other portion; and
the cable noise blocking unit and the second EMI noise blocking unit are spaced-apart from each other with respect to the bent portion.

13. The scan unit of claim 4, further comprising:
a power source spaced apart from the reading unit to supply power to the reading module through the cable; and
a second EMI noise blocking unit disposed at the other portion of the cable to block noise from the power source.

14. The scan unit of claim 4, further comprising:
a power source to provide power through the cable;
a controller to receive the image signal from the reading module through the cable; and
a second EMI noise blocking unit disposed adjacent to at least one of power source and the controller to block another noise from the power source.

15. A scan unit comprising:
a reading module having an image sensor to generate an image signal;
a power source to generate a power;
a cable disposed between the reading module and the power source to provide a transfer path of an image signal of the reading module and a power of the power source; and
an EMI noise blocking unit disposed on a first portion of the cable to block noise from the reading module, and disposed on a second portion of the cable to block noise from the power source,
wherein:
the cable comprises:
a first portion electrically connected to the reading module to transmit the image signal,
a second portion extended from the first portion and disposed to contact the side of the reading module, and
a third portion extended from the second portion electrically connected to a controller to transmit the image signal; and
the EMI noise blocking unit is disposed adjacent to the second portion.

* * * * *